US006802778B1

(12) United States Patent
Lemay et al.

(10) Patent No.: US 6,802,778 B1
(45) Date of Patent: Oct. 12, 2004

(54) GAMING APPARATUS AND METHOD WITH OPERATOR-CONFIGURABLE PAYTABLES

(75) Inventors: Steven G Lemay, Reno, NV (US); Andrea Hughs-Baird, Reno, NV (US)

(73) Assignee: IGT, Reno, NV (US)

( * ) Notice: Subject to any disclaimer, the term of this patent is extended or adjusted under 35 U.S.C. 154(b) by 381 days.

(21) Appl. No.: 09/659,955

(22) Filed: Sep. 12, 2000

Related U.S. Application Data

(60) Provisional application No. 60/153,603, filed on Sep. 13, 1999.

(51) Int. Cl.[7] .......................... G06F 19/00; G06F 17/00
(52) U.S. Cl. ............................. 463/42; 463/16; 463/25
(58) Field of Search ............................. 463/16, 25, 42, 463/11, 12, 13, 20, 21, 26, 40, 41, 29

(56) References Cited

U.S. PATENT DOCUMENTS 4,695,053 A 9/1987 Vazquez, Jr. et al. ....... 273/143
5,257,179 A 10/1993 DeMar ....................... 364/410
5,326,104 A * 7/1994 Pease et al. .................. 463/18
5,494,287 A 2/1996 Manz ..................... 273/143 R
5,542,669 A 8/1996 Charron et al. ............... 463/13
5,779,547 A 7/1998 SoRelle et al.
5,851,149 A * 12/1998 Xidos et al. .................. 463/42
5,878,408 A 3/1999 Van Huben et al. ............ 707/1
5,984,779 A * 11/1999 Bridgeman et al. ........... 463/16
6,068,552 A * 5/2000 Walker et al. ................ 463/21
6,254,483 B1 * 7/2001 Acres .......................... 463/26

OTHER PUBLICATIONS

Indexes to Subjects and Definitions in the Nevada Gaming Statutes and Regulations. Nevada Gaming Commission Regulations. Aug. 2000. Regulation 14.*

* cited by examiner

*Primary Examiner*—John M. Hotaling, II
*Assistant Examiner*—Julie Brocketti
(74) *Attorney, Agent, or Firm*—George H. Gerstman; Seyfarth Shaw LLP

(57) ABSTRACT

A gaming terminal and method are provided with which allow casino managers or other game operators to customize paytables, including poker paytables. Preferably, the system can verify or assist in verifying that the paytables comply with one or more various standards such as regulatory standards, e.g., such that the paytables are legal. In one aspect, paytable verification calculations, such as calculations of overall payback or hold percentages, preferably in the manner acceptable to regulatory authorities, are performed in the electronic gaming terminal, e.g., using the gaming terminal microprocessor.

5 Claims, 2 Drawing Sheets

GAMING APPARATUS AND METHOD WITH OPERATOR-CONFIGURABLE PAYTABLES

This application claims the benefit of Provisional application Ser. No. 60/153,603, filed Sep. 13, 1999

The present invention relates to gaming apparatus and methods which permit gaming operators to configure and/or modify game paytables and in particular to a system in which one or more gaming terminals include paytable configuration and overall payback analysis software as well as gaming software.

BACKGROUND INFORMATION

An important feature of many gaming terminals is the paytable which defines the prizes to be awarded for various game outcomes, often as a function of the size of the wager (such as the number of coins wagered). The nature of paytables, and the opportunities for the paytable modifications, are influenced, at least in part, by the nature of the game. For example, for many card games, such as typical five card draw poker, it is impossible or infeasible to change the nature or relative frequency of possible card hands or outcomes. In particular, either because of regulations or because of player or user expectations, card electronic card game machines typically cannot provide a hand which departs from hands that could be achieved in a physical card game and/or which appear with a frequency different from the frequency with which they appear in a physical card game. In contrast, games such as an electronic slot machine game can often be configured or modified to provide frequencies for outcomes that might differ from frequencies that could be achieved using a physical-reel slot machine (e.g., using so-called virtual reel approaches). Accordingly, whereas in an electronic slot machine the overall payback percent for a given paytable can be modified by, e.g., modifying the frequency for one or more winning combinations, as well as by multiplying payout amounts, a typical electronic draw poker machine cannot be modified to change the frequency of which particular winning hands occur and thus overall payback percentages can typically be modified only by modifying in the paytable the values of the prizes associated with winning hands.

Gaming operations and facilities are typically strictly regulated and such regulation typically includes requirements that paytables for gaming terminals must comply with standards for regulatory approval. Different jurisdictions have different requirements for what information must be supplied about a paytable to seek approval. In many situations, it must be shown that the overall payout percentage (i.e., the percentage, averaged over a long period of time, of the amount of wagers which are returned to players in the form of prizes) has been accurately determined. Accurate knowledge about the overall payout percentage (and/or the hold, which is 100% minus the payout percentage and typically represents revenues retained by the casino or other gaming operator) is also of interest to the gaming operator and, potentially, of interest to players or users of the gaming terminals.

In typical systems, paytables are embodied as information stored electronically in gaming terminals (or other electronic devices coupled to gaming terminals), often as part of the stored programming and data for which regulatory approval is required. In general, it has been typical for the manufacturers of the gaming terminals (and/or the electronics or software used in gaming terminals), as opposed to casino personnel or other gaming operators, to obtain approval of paytables for gaming terminals or systems. It is believed this is at least partially due to the relatively computationally-intensive nature of the process of determining overall payback for a given paytable, in a manner acceptable to regulatory bodies and/or with a high degree of accuracy, especially considering the very large number of possible outcomes for most games.

This situation, however, has sometimes been at odds with a desire of casinos or other game operators to have greater flexibility and shorter turn-around time for implementing games with different paytables. Thus, the typical scenario, in the past, has been for a game operator to consult with gaming terminal manufacturers, expressing a desire for a new or modified paytable for a game, for the terminal manufacturer or fabricator to perform the extensive calculation needed to determine items such as overall payback percentage and the like, for the gaming terminal fabricator to work with one or more different regulatory authorities to obtain approval, based on, at least in part, on such calculations (and sometimes involving further modifications of the paytable, with consultations with the originally-requesting gaming operators and regulatory authorities in order to achieve the desired approval) fabrication of the gaming terminal having the requested modified paytable and, finally, distribution to gaming operators. Such a process has typically been relatively difficult, expensive and time consumptive with a relatively large portion of the cost and effort being undertaken by the fabricator. The difficulty and delay involved in such a process has made it infeasible to provide the type of flexibility desired by operators who may wish to provide new or modified paytables in relatively short time frames, e.g., in response to rapidly changing market conditions, player tastes or preferences and the like. Accordingly, it would be useful to provide a gaming apparatus, system and method in which operators can directly, and preferably relatively rapidly, create and/or obtain regulatory approval for new or modified paytables, preferably with little, if any, need made for involvement by the gaming terminal manufacturer or fabricator.

One approach is to provide a gaming terminal which has two or more paytables for a given game, preferably previously approved by one or more gaming jurisdictions, which the gaming operator can select among, substantially without the need to involve, the gaming operator and with substantially little, if any, need for additional regulatory approval (in some cases, requiring only notification, to a regulatory authority, of which paytable has been selected). Although this approach can assist in reducing the time and/or cost for changing paytables for a given game, flexibility is limited since there are only a finite, and relatively small, number of paytables from which the operator may select. Typically there is no facility in such systems to allow modification or changes to the predefined (and, typically, preapproved) paytables. Accordingly, it would be useful to provide a system in which operators, preferably without the need to substantially involve gaming terminal manufacturers, can define new or modified paytables, without being restricted to selection among a plurality of predefined paytables, such as having the facility to change or modify prize amounts, or other values in a paytable, preferably providing substantially all information needed to apply for a regulatory approval of the new or modified paytable.

SUMMARY OF THE INVENTION

According to one aspect, the present invention permits and/or facilitates gaming operators modifying or defining a paytable for one or more gaming terminals. Preferably, this is implemented by providing software, preferably in one or more gaming terminals, which not only allows the definition or modification of paytables, but also arranges for carrying-out the above-described computationally-intensive process of calculating information needed to apply for regulatory approval such as calculating overall payout and/or hold percentages for the new or modified pay out paytable. Preferably the definition or modification of the paytable and the calculation of the overall payout percentage or other regulatory information is performed substantially entirely in the gaming terminal, i.e., and same device which is used by players for playing the game. Those of skill in the art will understand how to program and/or use computers or microprocessors to implement processes described herein including calculating various values, storing values, tables, arrays and the like, after understanding the present disclosure.

In order to implement the invention such that paytable modifications can be made at the gaming terminal, the system is preferably configured such that authentication is required (such as inserting a key, token, password or code) in order to define or modify a paytable.

Preferably, the system is configured to output, in printed form,or in electronic form, information designed to facilitate the application, to a regulatory authority, for approval of a new or modified paytable.

In one aspect, a gaming terminal and method are provided with which allow casino managers or other game operators to customize paytables, including poker paytables. Preferably, the system can verify or assist in verifying that the paytables comply with one or more various standards such as regulatory standards, e.g., such that the paytables are legal. In one aspect, paytable verification calculations, such as calculations of overall payback or hold percentages, preferably in the manner acceptable to regulatory authorities, are performed in the electronic gaming terminal, e.g., using the gaming terminal microprocessor.

DETAILED DESCRIPTION OF THE PREFERRED EMBODIMENT

Figure 1:
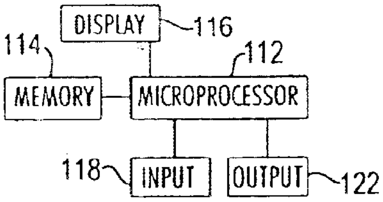
FIG. 1 is a block diagram of components of a gaming terminal that can be used in accordance with embodiments of the present invention.

As depicted in FIG. 1, electronic gaming terminals commonly include a microprocessor 112 coupled to a memory 114 and controlling a display 116, e.g., for displaying game results, as well as, typically, other items such as providing attract displays, game symbols or images, prize or award displays and the like, and often providing displays assisting in set-up or maintenance tasks. Electronic gaming terminals typically have other components such as coin or bill acceptors or other wager acceptors, card readers, key or button input, touch screen input, bell or light output, sound output, coin or other prize output, reel or other mechanical display components and the like. Gaming terminals may be standalone, although commonly gaming terminals are coupled in a network, such as being coupled to one or more cluster controllers, central computers and the like. Networking of gaming terminals can be used for uploading or downloading information from or to gaming terminals, e.g., for accounting purposes, maintenance, updating, implementing multi-terminal progressive or other multi-terminal games and the like. In some embodiments, gaming terminals may provide ports or connectors for coupling to other computers such as laptop computers, and/or peripheral devices such as printers, "floppy" disks and the like.

In general, the microprocessor 112 executes stored programs, typically stored in programmable read only memories (PRQM), electronically erasable programmable read only memories (EEPROM), flash memory and the like. In some gaming terminals, some or all programming or game parameters may be stored on hard drives or other mass storage devices preferably configured with one or more secure access procedures (e.g. hard drive write-protect circuitry, authorized access and the like). Programming defines one or more games and, typically, one or more paytables for each game determining or defining prizes to be paid in response to various game outcomes.

Figure 3:
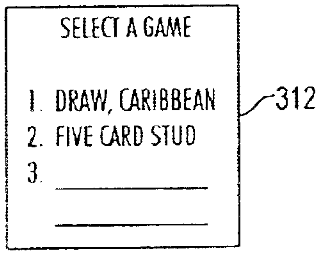
FIG. 3 illustrates a game selection display.
Figure 4:
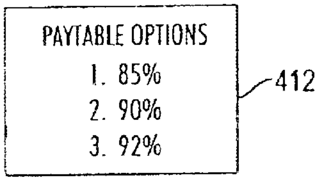
FIG. 4 illustrates a paytable selection display.
Figure 2:
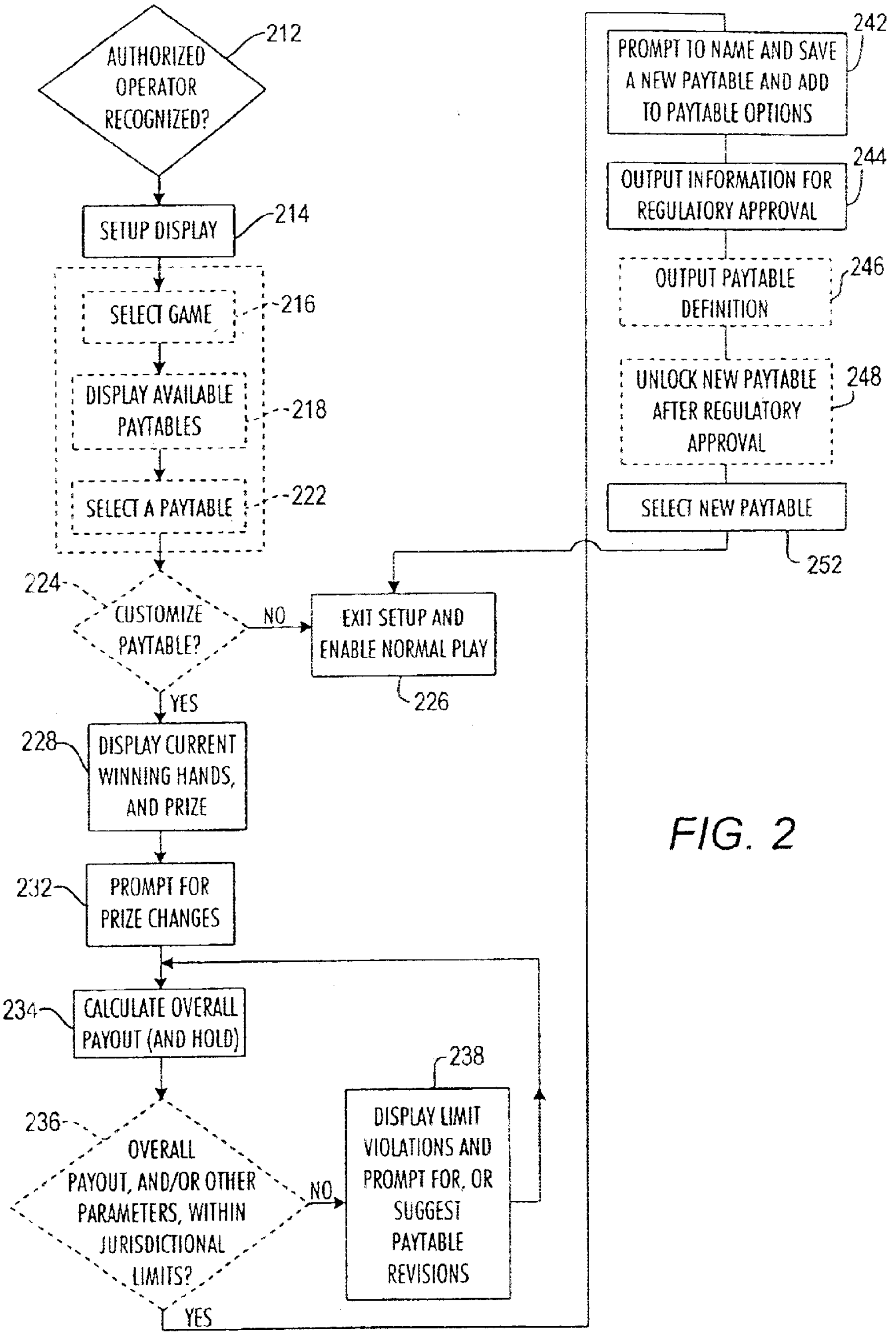
FIG. 2 is a flow diagram illustrating a process that can be used in accordance with an embodiment of the present invention for planning or modifying the paytables.

In the procedure depicted in FIG. 2, the gaming terminal can be placed in a configuration for defining or modifying paytables, beginning with providing authorization (such as a password or code, a token such as an encoded card, a key and the like, or combinations thereof) which will be recognized by the microprocessor 112 as identifying an authorized game operator 212. In response, the microprocessor 112 will control the display 116 to show a setup display 214. Many types of setup or maintenance displays can be provided. In one embodiment, the system will eventually provide a game select display 216 such as a display 312 (FIG. 3) listing some or all of the games that can be implemented on the gaming terminal. When the operator inputs a selection, e.g., via an input device 118 (which can be a device specific to setup operations or can be an input device which is also used during game play, such as a touch screen), the system will respond by displaying the paytables which are available for the selected game 218, such as a paytable option display 412 (FIG. 4). In the illustration of FIG. 4, the various paytable options are labeled by the overall payback percentage provided by such paytable, although it is possible to provide descriptive names or labels or other information, if desired. The operator may select one of the paytables 222, e.g., using input device 118. Although, in some embodiments, the operator may choose to implement the selected paytable in its current state, i.e., without change or modification, preferably the operator may indicate a desire to modify the paytable (i.e. to change values in a paytable before the paytable is stored back into the memory 114), may choose to use one of the paytables as a basis for creating a new paytable (i.e., storing the modified paytable, based on the selected paytable, in addition to storing the original, unmodified selected paytable), or, in some embodiments, may have the option to create a new paytable "from scratch". If the operator indicates he or she does not wish to customize the paytable 224, the selected paytable will be used in subsequent gaming and the setup routine will exit to enable normal game play 226.

Figure 5:
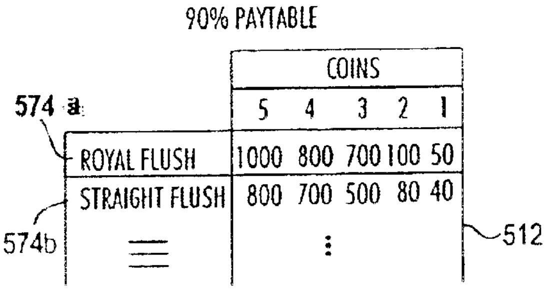
FIG. 5 illustrates a paytable modification or definition display.

If the operator indicates an intention to, for example, modify the selected paytable, aspects of the selected paytable are displayed 228 such as displaying the current winning hands of the paytable and payouts associated with the winning hands. For example, in the illustration of FIG. 5, a display 512 shows a selected paytable (in this example the "90%" paytable) and for each of the winning hands 514*a, b*, the magnitude of the prize that will be awarded in response to each of said winning hands 514*a,b*. In the example illustrated in FIG. 5, the paytable relates to a game in which users may wager between 1 and 5 coins, with the amount of the prize, for each winning hand, depending on the number of coins wagered.

As noted above, for certain types of games, such as, e.g. five card draw poker, the outcomes which are considered "winning" outcomes are established (by regulation and/or tradition) and typically cannot be changed by the operator. In other embodiments, it may be permitted for an operator to change which outcomes are considered winning outcomes. In the illustrated embodiment, the operator may modify the paytable, e.g., by providing input through input device 118 indicating a new value desired as one or more of the prize values of the paytable 512. For example, when the input device 118 is a touch screen device displaying various prize values, an operator may select the value to modify, by touching the value. In response, the system will display a (simulated) numeric key pad so that the operator can select the desired digits by pressing (simulated) keys. In other embodiments, the system may be configured such that the operator is presented with a plurality of choices for prize values, which the operator may select among.

In some embodiments, the system may provide instructions or prompt for input of the prize (or other paytable component) changes 232. Other manners in which the system can be configured to assist in entry or modification of paytable values will be apparent to those of skill in the art after understanding the present disclosure. Preferably, the operator has an option to indicate that he or she has completed making desired paytable entries. If desired, the system can perform certain integrity or regulatory checks. For example, the system may check the proposed newer or modified paytable to assure that there are no instances when a relatively larger prize is provided for a outcome having a first frequency, compared to a prize having a smaller frequency of occurrence. The system can verify there are no instances in which, for a given winning outcome, a larger prize is awarded for a first number of coins-bet compared to the prize for a larger number of coins-bet. The system may provide certain data validity checks (in some cases without the need for performing the detailed overall payout percentage calculation described below), e.g. identifying that the paytable is not likely to provide overall payback within certain thresholds (such as providing an overall payback which is not within a regulatory-allowed range and/or which provides a negative hold (i.e., a overall payback percentage in excess of 100%). Preferably, if the proposed paytable passes such integrity checks (if any), the system (preferably automatically) begins calculating information that may be needed or desired for applying for regulatory approval and/or to assure that payback percentages fall within a range defined by the casino or other game operator, e.g. to assist in deciding whether to implement the proposed paytable, such as by calculating the overall payout (and/or hold) percentage 234, e.g., using a procedure similar to that depicted in FIG. 6. By "automatic," in this context, it is meant that the system can perform the calculations without the need for further substantive information (i.e., substantive information other than defining or modifying entries in the paytable), although the system may prompt for, or require, input of non-substantive information (information not logically required for conducting the computations such as entry of a proposed name or identifier for the paytable, entry of a request to commence computations and the like).

Figure 6:
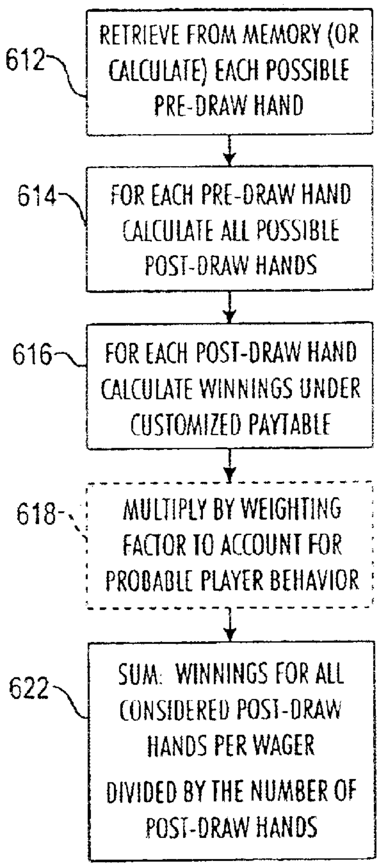
FIG. 6 is a flow chart depicting an overall payback percentage calculation process useable in accordance with an embodiment of the present invention.

In the particular embodiment depicted in FIG. 6, calculation is described with respect to a five card draw poker game, although those of skill in the art will understand how to provide for appropriate calculations for at least some other types of games. In the embodiment depicted in FIG. 6, all possible pre-draw poker hands are retrieved from memory (or, if desired, or calculated) 612. For five card draw poker, this will involve a list of all possible ways to select five cards out of 52 cards. Depending on implementation, the system can be configured to consider, as unique, only combinatorically unique hands, or can be configured to consider, as unique, all hands including those possible hands which differ only in the order of the cards. In either case, the number of possible hands is large, such as approaching three million. In a combinatorics sense, the number of hands possible pre-draw hands can be expressed by $$\frac{n!}{n!(n-r)!} \tag{1}$$

where n=number of cards in the deck r=number of cards in a hand

In response to a pre-draw hand, a player may choose to discard, and receive "replacement" draw cards, for 0, 1, 2, 3, 4, or 5 of the pre-draw cards. Typically, the game is configured to precisely simulate physical cards and accordingly none of the drawn cards can be a card which was in the pre-draw hand (or can be one of the previous "replacement" cards). However, for each of the (large number of) pre-draw hands, there is a large number of ways to form a post-draw hand. In a combinatorics sense, the possible number of post-draw hands can be expressed as $$\frac{n!}{n!(n-r)!}\cdot\left[1+\sum_{k=1}^{r}\frac{(n-r)!}{k!(n-r-k)!}\right] \tag{2}$$

This represents a number which is so large that it may be infeasible and not cost-effective, to store all possible post-draw hands in table form. However, it is believed that some regulatory jurisdiction require the express specification of all possible outcomes (as opposed to, e.g., calculating on the basis of a stored table of percentages of frequencies of various winning outcomes) to apply for and/or achieve regulatory approval. Accordingly, in at least one embodiment of the invention, the post-draw possible hands are calculated (rather than stored) 614.

Figure 7:
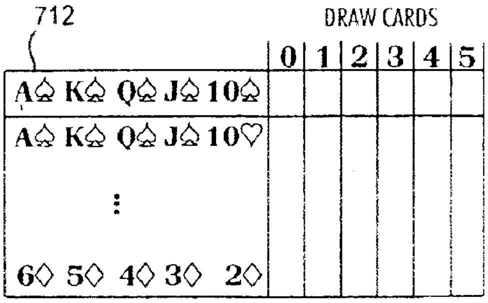
FIG. 7 illustrates an array for values that can be used in calculating overall payback percentage according to an embodiment of the present invention.

In one embodiment, in order to calculate the overall payback percentage, payback-related information is calculated, and stored, e.g., in an array 712 (FIG. 7) for each number of possible discard/draw cards, for each possible predraw hand. The winnings, in this manner, are calculated under the proposed customized (modified or new) paytable 616. In general, regulatory authorities require calculation in which the payback percentage assumes that the plays and winning outcomes are random. Thus, the system, in one embodiment, will include a calculation of the various post-draw hands that can result, even when the pre-draw hand is, e.g. a royal flush (where it is highly unlikely the player will discard any cards). In one embodiment, the present invention can be configured to also perform a calculation (e.g., for use by the casino operator in evaluating whether the casino operator wishes to implement a particular paytable) which takes into account factors such as the low probability that a player will discard any cards from a pre-draw hand which is a royal flush or similar desirable hand, and the like. Accordingly, in one embodiment the system may include a step (e.g., for providing results to be used by the game operator, rather than by the regulatory authority) which multiplies expected winnings by a weighting factor to account for probable player behavior 618 such as by multiplying all post-draw winnings arising from non-zero draws based on a royal flush (or similar desirable) pre-draw hand by a low or zero value or weighting factor).

A number of ways of calculating the overall payback percentage can be used. In the example illustrated in FIG. 6, the system calculates 622 a sum of the winnings for all the considered post-draw hands, on a per-wager basis (e.g., divided by the number or value of coins wagered), divided by the number of post-draw hands. As will be clear to those of skill in the art after understanding the present disclosure, because of the very large numbers involved (e.g., as expressed in Equation 2), care must be taken to assure that sufficient accuracy is retained (such as avoiding, or accounting for, storage or calculations involving very large or very small numbers, to avoid rounding errors, truncation, and the like). Additionally, because of the relatively large number of computations that are needed, e.g., in the embodiment depicted in FIG. 6, preferably the system is configured to perform the calculations efficiently (e.g., using array processing, vector or pipeline processing and similar programming techniques) so that the calculations can be performed in a reasonable amount of time. In one embodiment, the calculations 234 are performed, e.g., using the microprocessor 112, in less than about 1 hour, preferably less than about 20 minutes, more preferably less than about 10 minutes.

After performing the calculations 234, the results are preferably screened to identify whether the proposed paytable meets various criteria such as overall payout limitations or other parameters, e.g., set by regulatory jurisdictions 236, casino operators or the like. Other tests or comparisons can be made such as data integrity tests and the like, if desired. Preferably, if the proposed paytable violates certain, preferably predefined, limits or tests, the system displays the violation and prompts for, or in some embodiments, suggests, additional paytable revisions 238 with the thus-revised proposed paytables being, again, subjected to the described calculation 234. If desired, the system may prompt the operator to input a name or label for the new paytable and save the new paytable, e.g., to memory 114 preferably adding the new paytable to a list of available paytable options 242 so that it can be displayed (e.g., in a display similar to display 412) in a fashion permitting the operator to select the new paytable.

Preferably, the system will output information, e.g., using output device 122 (such as printing, recording on magnetic disk and the like) which can be used for applying for or obtaining regulatory approval for the new paytable 244. It is also possible to implement embodiments of the invention in which approval is requested or provided (at least partially) electronically. For example, approval may be requested by commnunicating the paytable and related information to a remote (host) computer (e.g. a computer of a regulatory agency), where approval can be made. For example information can be sent across a network (e.g. a local area network, a wide area network, a satellite link, a secure Internet link and the like) to a system designated by a regulatory agency for approving changes. If approved an authorization can be sent back to authorize and/or enable use of the change.

In one embodiment, the information defining the new paytable is output 246 (and/or stored in a fashion for later output or transfer, such as by recording on magnetic disk and the like). In this way, preferably after the new paytable has received regulatory approval, the new paytable may be loaded into a plurality of other gaming terminals (e.g., without the need for performing manual paytable modification or entry steps 232, in each and every terminal where the new paytable is to be implemented. However, in other embodiments it may be desired to require manual entry of paytable information 232 and/or calculation 234 in each terminal before a paytable is modified or added, e.g., to more securely assure regulatory compliance and/or in situations where it is more likely that paytables will be individualized to each terminal.

In some embodiments, the newly-defined paytable will be locked (marked as unavailable for use) at least until such time as information is stored in the terminal unlocking the paytable and/or indicating that regulatory approval has been achieved. For example, locking and/or unlocking 248 can assist in avoiding inadvertent and/or unauthorized implementation of a paytable (e.g. prior to regulatory approval). In any case, after the paytable is available, e.g. in one or more paytable option displays 412, an operator may select a new paytable 252, before returning the terminal to enable normal play 226.

In light of the above description a number of advantages of the invention can be seen. The invention makes it practical and feasible for operators to modify or define paytables for games, including draw poker and other card games, substantially without the need to involve the game apparatus manufacturer or fabricator. The present invention can be configured to provide the calculation and output used or needed for applying for and/or obtaining regulatory approval for new paytables. The present invention can provide for automatic calculation, e.g., such that the new paytable can be defined by the operator having only knowledge of paytable definitions, and without the need for operator knowledge of programming, probabilities, combinatorics and the like. The present invention is preferably provided in gaming terminals so that a game operator can modify or design paytables by using substantially only the gaming terminal, without the need to purchase or use other computers or facilities. By arranging to have the computationally intensive calculations performed using the computers of the casino or other gaming operator, and preferably using the gaming terminal itself (as opposed to using computers of, e.g., the gaming terminal manufacturer or fabricator), the burden of such computations is distributed, and is born by the gaming operator rather than the apparatus manufacturer. By configuring a system in which the overall payback percentage or similar calculations are performed substantially automatically in response to input of a new or modified paytable, i.e., without requiring programming, other data or parameter input or calculation or any other substantive steps, other than entering or modifying values in a paytable, it becomes feasible for the steps to be performed by the operator, who thus does not need to have specialized knowledge of probability, combinatorics and/or computer programming.

A number of variations and modifications of the invention can be used. Some features of the invention can be used without using others. For example, it is possible to implement configurations in which a gaming terminal apparatus allows the creation or modification of paytable data but in which some or all calculations for regulatory approval are not performed in the gaming terminal (such as being performed on other computers or at other locations). The present invention can be implemented using procedures which are different from, or have more steps or fewer steps or performs steps in different order, from those described above. For example, a procedure can prompt for a paytable name 242 prior to calculating overall payout 234. Although one fashion of calculating overall payout percentages has been described (e.g., FIG. 6). Other manners of making such calculation will be clear to those of skill in the art after understanding the present disclosure. Although embodiments have been described in which the definition of a paytable or modification, and/or calculation of overall payback percentages or other regulatory information are performed within the gaming terminal, it is possible, either during such definition calculation, or at a different time, to perform some or all of these calculations in other computers, such as computers networked to the gaming terminal or which may otherwise be coupled to or communicate with the gaming terminal for performing one or both of these functions. Although the invention has been described in connection with a draw poker game, the invention can be used in connection with paytables for other games including 21, rummy or other card games, and/or in connection with non-card games such as keno, roulette, wheel of fortune or other wheel games, slot machine games, and the like. In some embodiments, the system can be configured to assist in entering paytable values such as by automatically inserting certain calculated or default values. For example, in one embodiment, the system may be configured such that, by default, a change in a prize value with respect to a given number of coins that (for a particular winning outcome) will automatically insert value changes for the other coins-bet positions (for the same winning outcome) such as so as to maintain the same magnitude proportion of prizes among the various coins-bet categories (for the particular winning outcome). Embodiments of the present invention can be implemented to provide a computer system providing verification of paytables and, e.g. transferring that information to the gaming terminal. Additionally, paytable information can be sent from a gaming terminal or other local (e.g. casino) site to a host (e.g. remote) computer for verification and/or authorization before the paytable is (or can be) enabled on the gaming terminal. In some embodiments, once a paytable has been verified, the system can provide for secure replication of the verified paytable for distribution to a plurality of gaming terminals.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease andor reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A. method for configuring a paytable for a gaming terminal, the gaming terminal having a processor which controls game play of said gaming terminal, said processor coupled to a memory, a display device, and at least one input device, comprising:

receiving identification information from a gaming operator;

comparing said identification information with authorized identities to verify that said gaming operator is authorized to access paytables of said gaming terminal;

displaying, on said display device, a setup routine including paytables which are available;

enabling said gaming operator, using said input device, to either select one of said available paytables without modification, or to modify the paytable thereby creating a new paytable;

the displayed available paytables having advance government approval;

said game operator chooses to modify a paytable, then displaying on said display device, information for enabling the operator to modify said paytable;

thereafter electronically transmitting information relating to said modified paytable from said gaming terminal resulting from said operator selection for government regulatory approval;

thereafter electronically receiving at said gaming terminal a message if said modified paytable fails to obtain government regulatory approval; and storing said modified paytable in said memory and enabling play with said modified paytable only if government approval is obtained.

2. The method of claim 1, in which said gaming operator modifies the paytable thereby creating a new paytable by changing the magnitude of a monetary prize, in the absence of an ability of said gaming operator to define or change a prize win frequency.

3. The method of claim 1 in which, when the gaming operator chooses to modify the paytable, the gaming terminal outputs at least one suggested modification of said paytable when the modified paytable fails to obtain said government regulatory approval.

4. The method of claim 1 in which said paytable is modified thereby creating a new paytable by a change in overall payback percentage.

5. The method of claim 1 in which the step of modifying the paytable thereby creating a new paytable includes the step of calculating all possible game outcomes of said new paytable and any prizes associated with each possible game outcome.

* * * * *

UNITED STATES PATENT AND TRADEMARK OFFICE

CERTIFICATE OF CORRECTION

PATENT NO. : 6,802,778 B1
APPLICATION NO. : 09/659955
DATED : October 12, 2004
INVENTOR(S) : Lemay et al.

It is certified that error appears in the above-identified patent and that said Letters Patent is hereby corrected as shown below:

Column 10, line 35 insert “if” before “said game operator”.

Signed and Sealed this

Third Day of February, 2009

JOHN DOLL
*Acting Director of the United States Patent and Trademark Office*